Sept. 14, 1937.  E. G. HAZEL  2,093,318
GRASS CUTTER
Filed Aug. 31, 1936  2 Sheets-Sheet 1

Eugene G. Hazel, INVENTOR
BY Victor J. Evans & Co.
ATTORNEYS

Sept. 14, 1937. E. G. HAZEL 2,093,318
GRASS CUTTER
Filed Aug. 31, 1936 2 Sheets-Sheet 2
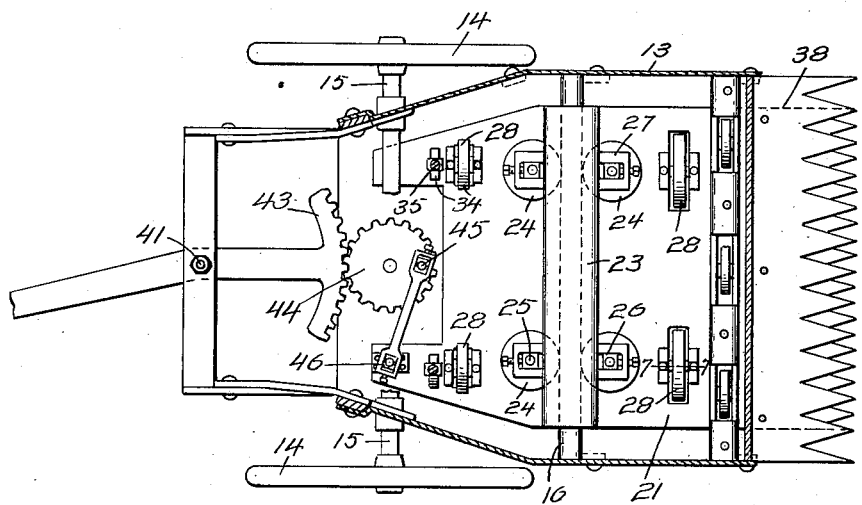
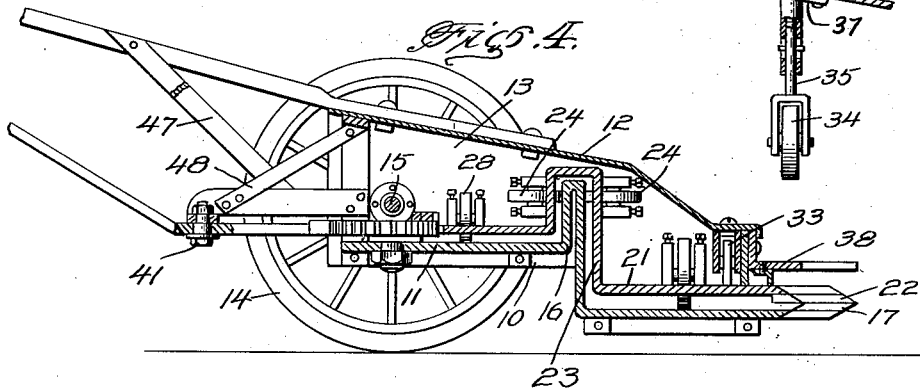
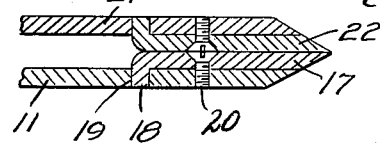
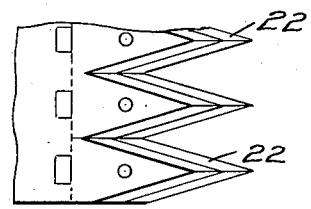
Eugene G. Hazel, INVENTOR
BY Victor J. Evans & Co.
ATTORNEYS Patented Sept. 14, 1937

2,093,318

UNITED STATES PATENT OFFICE 2,093,318

GRASS CUTTER

Eugene Gaston Hazel, Tangerine, Fla.

Application August 31, 1936, Serial No. 98,803

7 Claims. (Cl. 56—260)

The invention relates to a grass cutter and more especially to a wheeled grass clipper.

The primary object of the invention is the provision of an implement of this character, wherein through the use of mower blades, one movable relative to the other, grass can be clipped for the even cutting thereof when the implement is rolled over the ground or a lawn, the implement being of novel construction and is manually driven both for the advancement thereof and for its clipping operation.

Another object of the invention is the provision of an implement of this character, wherein the grass upon a lawn will be prevented from falling over and escaping cutting action of the cutter of the implement and such grass will be readily and easily cut, the working parts of the implement being enclosed to eliminate accumulation of dirt, foreign matter and cut grass while in operation.

A further object of the invention is the provision of an implement of this character, wherein the movable cutting blade is mounted in a novel manner so that the same can be reciprocated for coaction with cutting points and has a clipper action.

A still further object of the invention is the provision of an implement of this character, which is simple in construction, thoroughly reliable and efficient in operation, readily and easily handled, enabling the cutting of grass at any height from the ground and especially for close cutting of the grass, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 3 is an enlarged horizontal sectional view through the implement.

Figure 4 is a vertical longitudinal sectional view thereof.

Figure 5 is an enlarged sectional view through the cutting blade.

Figure 6 is a fragmentary bottom plan view of the cutting blade.

Figure 9 is a fragmentary sectional view on the line 9—9 of Figure 1.

Similar reference characters indicate corresponding parts throughout the several views in the drawings.

Figure 1:
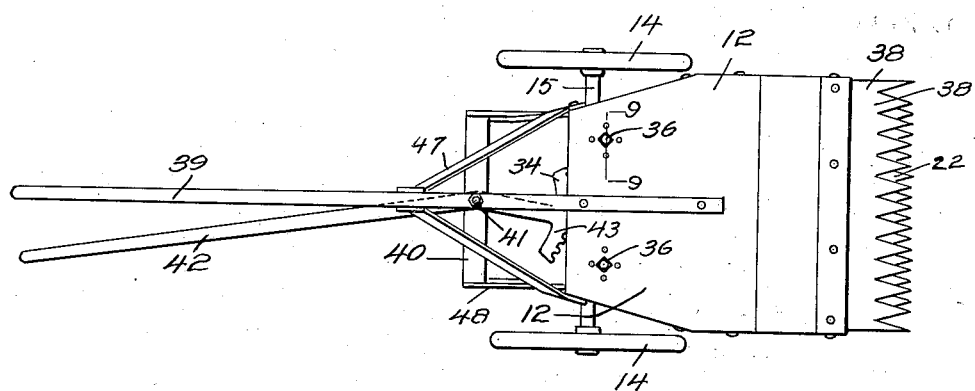
Figure 1 is a top plan view of an implement constructed in accordance with the invention.
Figure 2:
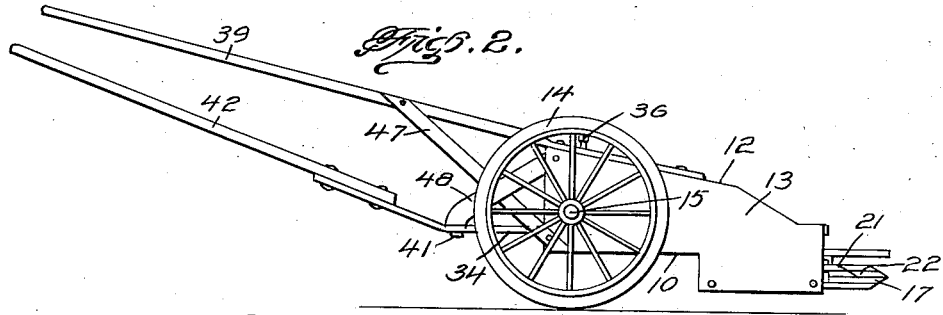
Figure 2 is a side elevation thereof.
Figure 7:
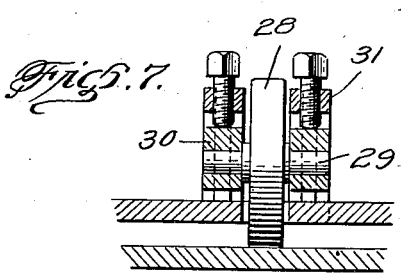
Figure 7 is a detail sectional view on the line 7—7 of Figure 3.
Figure 8:
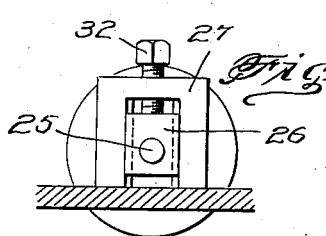
Figure 8 is a fragmentary sectional view showing in detail one of the adjustable mountings for a guide roller of the implement.

Referring to the drawings in detail, the implement comprises a body frame 10 having a bottom covering 11, top covering 12 and end coverings 13, respectively, the fore portion of the frame being of greater width than the rear portion thereof. This frame is supported by ground wheels 14 journaled on an axle 15 suitably built with the body frame 10.

Formed intermediate of the front and rear portions of the body frame 10 is a riser 16 which is bent perpendicularly from the bottom covering 11 while at the forward end of the body frame 10 and interlocked with the bottom covering 11 at its front edge are stationary saw tooth-like cutting points 17, each having a heel nib 18 downturned and fitted within a socket 19 therefor in said bottom covering 11 while the said point is detachably secured in place by a fastener 20. These points in the series thereof make up the stationary cutting blade for the implement.

Transversely shiftable within the body frame above the bottom covering 11 therefor is a carrier 21 which has its forward edge confronting the points 17 and at this edge are arranged the cutting points 22 which with the carrier 21 function as the movable cutting blade of the implement. These points 22 are fastened to the carrier 21 similarly to the fastening of the points 17 and cooperate with the latter for the clipping of grass on advancement of the implement over a lawn or the ground.

The carrier 21 has the intermediate bridge 23 for the riser 16 and at this bridge are arranged on opposite sides of the riser 16, trackage rollers 24, the axles 25 of which are journaled in shiftable bearings 26, slidably fitting guides 27 built on the bridge 23 and such rollers travel upon the riser 16 when the carrier 21 is reciprocated.

Forwardly and rearwardly of the bridge 23 are trackage rollers 28, each having its axle 29 journaled in bearings 30, slidably fitting guides 31 built upon the carrier 21 and such rollers 28 have trackage on the bottom covering 11. The bearings 26 and 30 are adjustable by set screws 32 fitting the said guides 27 and 31, respectively.

Tracking upon the carrier 21 fore and aft of the bridge 23 are the front and rear rollers 33 and 34, respectively. The roller 34 is journaled in a fork 35 which is adjustable by a set screw 36 while the roller 33 is journaled in a bearing 37 on the top covering 12.

This top covering at the front thereof carries a guard 38 overhanging the stationary and movable blades of the implement. The guard 38 is fingered corresponding to the points of the said blades.

Fixed medially of the top covering 12 at the rear of the implement is a handle bar 39 while pivoted to a rear extension 40 at the bottom of the body frame 10 as at 41 is an actuating lever or arm 42 for a toothed sector 43 integral therewith and meshing with a toothed gear 44 to which is eccentrically pivoted a throw arm or pitman 45, the same being also pivoted at 46 to the carrier 21. Thus on oscillating the lever 42 the toothed gear 44 will be turned and in this manner through the pitman 45 the carrier 21 will be reciprocated and likewise the cutter blade points 22 which cooperate with the points 17 enable the clipping of grass.

The body frame 10 swings on a horizontal axis, namely, the axle 15 and in this manner the grass can be cut long or short or close to the ground surface as required.

Suitable braces 47 and 48, respectively, are built in the implement to assure rigidity and strength thereto.

The carrier 21 is reciprocated with minimum friction and is easily operated by the lever 42.

The implement is pushed over ground surfaces and when the lever 42 is actuated the clipping of the grass can be had.

What is claimed is:

1. An implement of the character described comprising a wheeled body frame having a bottom cover formed with a vertical riser intermediate thereof, a laterally shiftable carrier above said body covering and having a bridge over the riser, rollers supported by the carrier and having trackage on the bottom cover and said riser, respectively, and coacting clipper blades carried by the carrier and body frame, respectively, at the front of the latter.

2. An implement of the character described comprising a wheeled body frame having a bottom cover formed with a vertical riser intermediate thereof, a laterally shiftable carrier above said body covering and having a bridge over the riser, rollers supported by the carrier and having trackage on the bottom cover and said riser, respectively, coacting clipper blades carried by the carrier and body frame, respectively, at the front of the latter, and manually actuated means at the rear of the body frame and acting on said carrier for the shifting thereof.

3. An implement of the character described comprising a wheeled body frame having a bottom cover formed with a vertical riser intermediate thereof, a laterally shiftable carrier above said body covering and having a bridge over the riser, rollers supported by the carrier and having trackage on the bottom cover and said riser respectively, coacting clipper blades carried by the carrier and body frame, respectively, at the front of the latter, manually actuated means at the rear of the body frame and acting on said carrier for the shifting thereof, and trackage rollers on the body frame above said carrier and engaged therewith.

4. An implement of the character described comprising a wheeled body frame having a bottom cover formed with a vertical riser intermediate thereof, a laterally shiftable carrier above said body covering and having a bridge over the riser, rollers supported by the carrier and having trackage on the bottom cover and said riser, respectively, coacting clipper blades carried by the carrier and body frame, respectively, at the front of the latter, manually actuated means at the rear of the body frame and acting on said carrier for the shifting thereof, trackage rollers on the body frame above said carrier and engaged therewith, and a handle bar at the rear of said body frame and above said means.

5. An implement of the character described comprising a wheeled body frame having a bottom cover formed with a vertical riser intermediate thereof, a laterally shiftable carrier above said body covering and having a bridge over the riser, rollers supported by the carrier and having trackage on the bottom cover and said riser, respectively coacting clipper blades carried by the carrier and body frame, respectively, at the front of the latter, manually actuated means at the rear of the body frame and acting on said carrier for the shifting thereof, trackage rollers on the body frame above said carrier and engaged therewith, a handle bar at the rear of said body frame and above said means, and a guard on the body frame and overhanging the movable cutter.

6. An implement of the character described comprising a wheeled body frame having a bottom cover formed with a vertical riser intermediate thereof, a laterally shiftable carrier above said body covering and having a bridge over the riser, rollers supported by the carrier and having trackage on the bottom cover and said riser, respectively, coacting clipper blades carried by the carrier and body frame, respectively, at the front of the latter, manually actuated means at the rear of the body frame and acting on said carrier for the shifting thereof, trackage rollers on the body frame above said carrier and engaged therewith, a handle bar at the rear of said body frame and above said means, a guard on the body frame and overhanging the movable cutter, and top and side covering on the body frame.

7. An implement of the character described comprising a wheeled body frame having a bottom cover formed with a vertical riser intermediate thereof, a laterally shiftable carrier above said body covering and having a bridge over the riser, rollers supported by the carrier and having trackage on the bottom cover and said riser, respectively, coacting clipper blades carried by the carrier and body frame, respectively, at the front of the latter, manually actuated means at the rear of the body frame and acting on said carrier for the shifting thereof, trackage rollers on the body frame above said carrier and engaged therewith, a handle bar at the rear of said body frame and above said means, a guard on the body frame and overhanging the movable cutter, top and side covering on the body frame, and means for adjusting the tracking rollers.

EUGENE GASTON HAZEL.